United States Patent
Lee et al.

(10) Patent No.: US 9,210,398 B2
(45) Date of Patent: Dec. 8, 2015

(54) METHOD AND APPARATUS FOR TEMPORALLY INTERPOLATING THREE-DIMENSIONAL DEPTH IMAGE

(75) Inventors: Seung Kyu Lee, Seoul (KR); Hwa Sup Lim, Hwaseong (KR); Do Kyoon Kim, Seongnam (KR); Kee Chang Lee, Yongin (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 700 days.

(21) Appl. No.: 13/088,685

(22) Filed: Apr. 18, 2011

(65) Prior Publication Data

US 2011/0286661 A1    Nov. 24, 2011

(30) Foreign Application Priority Data

May 20, 2010   (KR) .................. 10-2010-0047401

(51) Int. Cl.
- *G06K 9/00* (2006.01)
- *H04N 13/00* (2006.01)
- *H04N 13/02* (2006.01)
- *G06T 3/40* (2006.01)

(52) U.S. Cl.
CPC .......... *H04N 13/0022* (2013.01); *G06T 3/4007* (2013.01); *H04N 13/025* (2013.01); *H04N 13/0271* (2013.01)

(58) Field of Classification Search
USPC ........................................................ 382/154
See application file for complete search history.

(56) References Cited

U.S. PATENT DOCUMENTS

| | | | | |
|---|---|---|---|---|
| 4,633,293 A * | 12/1986 | Powers | ......................... | 348/441 |
| 4,925,294 A * | 5/1990 | Geshwind et al. | ............... | 352/57 |
| 5,371,778 A * | 12/1994 | Yanof et al. | ....................... | 378/4 |
| 5,557,684 A * | 9/1996 | Wang et al. | .................... | 382/107 |
| 5,969,350 A * | 10/1999 | Kerley et al. | .................... | 250/287 |
| 6,084,978 A * | 7/2000 | Taylor et al. | ................... | 382/154 |
| 6,192,080 B1 * | 2/2001 | Sun et al. | .................. | 375/240.16 |
| 6,269,175 B1 * | 7/2001 | Hanna et al. | ................... | 382/107 |
| 7,035,451 B2 * | 4/2006 | Harman et al. | ................ | 382/154 |
| 7,098,998 B2 * | 8/2006 | Terauchi et al. | .............. | 356/3.14 |
| 7,363,157 B1 * | 4/2008 | Hanna et al. | ....................... | 702/5 |

(Continued)

FOREIGN PATENT DOCUMENTS

| | | |
|---|---|---|
| JP | 2008-78772 | 4/2008 |
| JP | 2010-45666 | 2/2010 |

(Continued)

OTHER PUBLICATIONS

Chen et al., "Frame-rate up-conversion using transmitted true motion vectors", 1998, Multimedia Signal Processing, 1998 IEEE Second Workshop on, p. 1-6.*

(Continued)

*Primary Examiner* — Gandhi Thirugnanam
(74) *Attorney, Agent, or Firm* — Harness, Dickey & Pierce, P.L.C.

(57) ABSTRACT

A method and apparatus for temporally interpolating a three-dimensional (3D) depth image are provided to generate an intermediate depth image in a desired time. The apparatus may interpolate depth images generated by a depth camera, using a temporal interpolation procedure, may generate an intermediate depth image in a new time using the interpolated depth images, and may combine the generated intermediate depth image with color images, to generate a high-precision 3D image.

10 Claims, 7 Drawing Sheets

(56) References Cited

U.S. PATENT DOCUMENTS

| | | | |
|---|---|---|---|
| 7,454,131 B2* | 11/2008 | Suda | 396/55 |
| 8,139,863 B1* | 3/2012 | Hsu | 382/190 |
| 8,320,620 B1* | 11/2012 | Cohen | 382/103 |
| 2002/0015007 A1* | 2/2002 | Perlin et al. | 345/6 |
| 2002/0048395 A1* | 4/2002 | Harman et al. | 382/154 |
| 2002/0060784 A1* | 5/2002 | Pack et al. | 356/6 |
| 2004/0105573 A1* | 6/2004 | Neumann et al. | 382/103 |
| 2004/0252230 A1* | 12/2004 | Winder | 348/402.1 |
| 2004/0252759 A1* | 12/2004 | Winder et al. | 375/240.12 |
| 2006/0050952 A1 | 3/2006 | Blais et al. | |
| 2006/0088101 A1* | 4/2006 | Han et al. | 375/240.16 |
| 2006/0210146 A1* | 9/2006 | Gu | 382/154 |
| 2006/0269155 A1* | 11/2006 | Tener et al. | 382/243 |
| 2007/0024611 A1* | 2/2007 | Ingram | 345/419 |
| 2007/0242872 A1* | 10/2007 | Rudin et al. | 382/154 |
| 2007/0269102 A1* | 11/2007 | Wang | 382/154 |
| 2010/0141651 A1* | 6/2010 | Tan | 345/420 |
| 2011/0164792 A1* | 7/2011 | Yoon et al. | 382/118 |
| 2011/0286661 A1* | 11/2011 | Lee et al. | 382/154 |
| 2012/0106803 A1* | 5/2012 | Lee et al. | 382/107 |
| 2012/0127269 A1* | 5/2012 | Wang | 348/43 |
| 2012/0182388 A1* | 7/2012 | Lim et al. | 348/43 |
| 2012/0287233 A1* | 11/2012 | Wang et al. | 348/42 |
| 2013/0177236 A1* | 7/2013 | Kim et al. | 382/154 |

FOREIGN PATENT DOCUMENTS

| | | |
|---|---|---|
| KR | 10-2009-0050783 | 5/2009 |
| KR | 10-2009-0102688 | 9/2009 |

OTHER PUBLICATIONS

Castagno R., et al. "A Method for Motion Adaptive Frame rate Up-conversion" 1996, IEEE Transactions on circuits and systems for video technology vol. 6 No. 5., p. 436-446.*

Extended European Search Report dated Jun. 2, 2015.

* cited by examiner

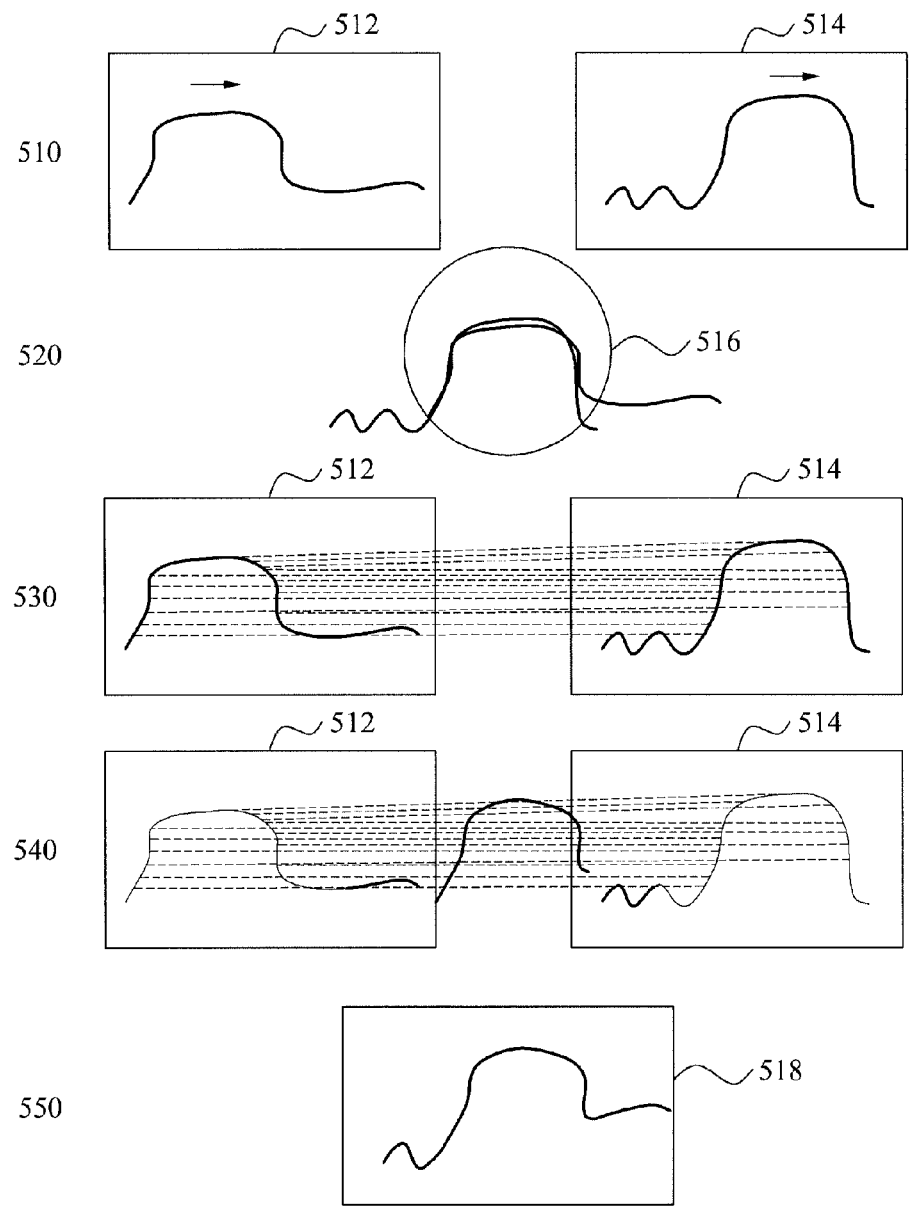

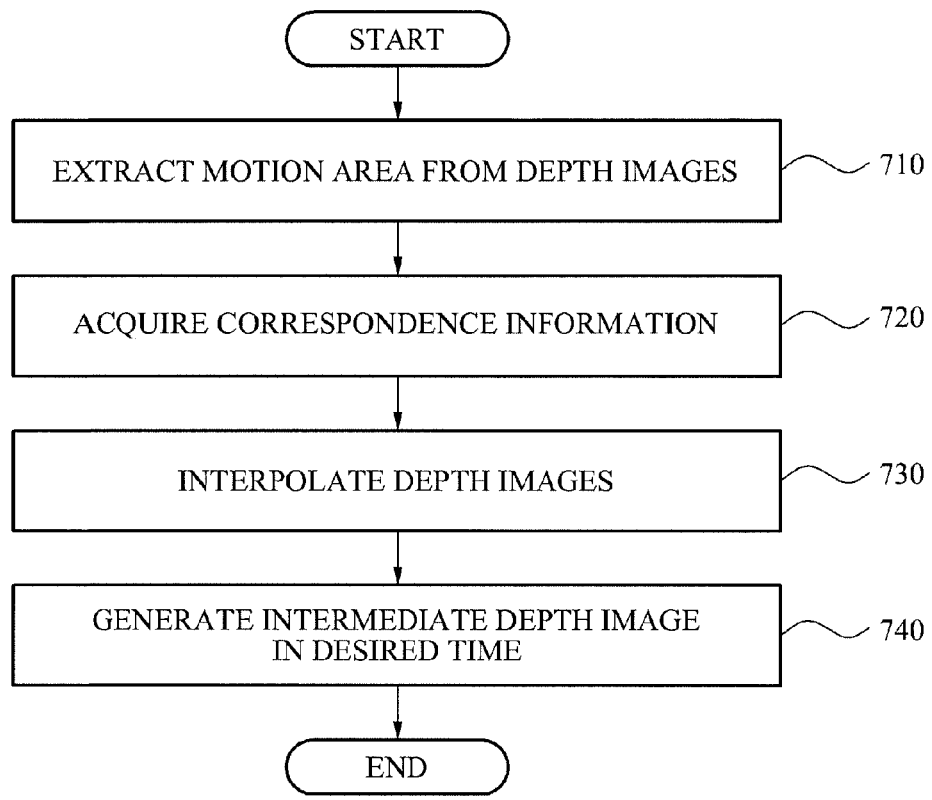

METHOD AND APPARATUS FOR TEMPORALLY INTERPOLATING THREE-DIMENSIONAL DEPTH IMAGE

CROSS-REFERENCE TO RELATED APPLICATIONS

This application claims the priority benefit of Korean Patent Application No. 10-2010-0047401, filed on May 20, 2010, in the Korean Intellectual Property Office, the disclosure of which is incorporated herein by reference.

BACKGROUND

1. Field

One or more embodiments of the following description relate to a technology that may easily form a three-dimensional (3D) image using depth images generated by a depth camera, and color images generated by a color camera.

2. Description of the Related Art

To obtain high-precision three-dimensional (3D) images, Time of Flight (TOF) sensors, such as color cameras and depth cameras, have recently been used. When a color camera and a depth camera are used together, frame synchronization may be inevitably performed between the color camera and the depth camera or between camera modules, to obtain accurate 3D information.

However, in various external environments, for example, in the case of using both a color camera and a depth camera that are difficult to be matched, or in the case of using a camera configured with, for example, one lens and one sensor being based on a time sharing scheme, it is difficult to accurately match 3D images due to temporal inconsistency between acquired color images and acquired depth images.

To prevent temporal inconsistency in image acquiring time, there is a desire for a method of generating a depth image in a desired time from images that are acquired in advance, using an image processing procedure.

SUMMARY

The foregoing and/or other aspects are achieved by providing an apparatus temporally interpolating a three-dimensional (3D) depth image, the apparatus including: a temporal interpolation unit to interpolate depth images using a temporal interpolation procedure, the depth images being generated from a depth camera; and an intermediate depth image generator to generate an intermediate depth image in a new time using the interpolated depth images.

The apparatus may further include a motion area extractor to extract a motion area including a moving object from the depth images, and a correspondence acquiring unit to acquire correspondence information regarding a correspondence between the depth images from which the motion area is extracted.

The temporal interpolation unit may interpolate the depth images based on the acquired correspondence information, using the temporal interpolation procedure.

The apparatus may further include a color image acquiring unit to acquire, from a color camera, color images located temporally adjacent to the depth images. The correspondence acquiring unit may acquire the correspondence information regarding the correspondence between the depth images based on at least one of a continuity between the color images and the depth images, a distance between the depth images, and color feature values of the color images.

The correspondence acquiring unit may compensate for motion in a motion area included in the depth images using an Iterative Closest Point (ICP) procedure, and may acquire correspondence information regarding a correspondence between the depth images where the motion is compensated for. The apparatus may further include a time difference information acquiring unit to optimize at least one of the acquired color images, the correspondence information, and a time variable, and may acquire time difference information between the depth images and the color images.

The intermediate depth image generator may generate an intermediate depth image in a new time, based on the acquired time difference information. Additionally, the intermediate depth image generator may generate the intermediate depth image in the new time using the acquired color images.

When a motion area does not exist in one depth image among the depth images, the intermediate depth image generator may generate, as an average of the depth image and a neighboring depth image located adjacent to the depth image, an intermediate depth image in a new time.

The foregoing and/or other aspects are also achieved by providing a method of temporally interpolating a 3D depth image, the method including: extracting a motion area from depth images acquired from a depth camera; acquiring correspondence information regarding a correspondence between the depth images from which the motion area is extracted; interpolating the depth images based on the acquired correspondence information, using a temporal interpolation procedure; and generating an intermediate depth image in a desired time from the interpolated depth images.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which:

FIG. 5 illustrates an example of generating an intermediate depth image in a new time according to embodiments;

FIG. 7 illustrates a flowchart of a method of temporally interpolating a 3D depth image according to embodiments.

DETAILED DESCRIPTION

Figure 1:
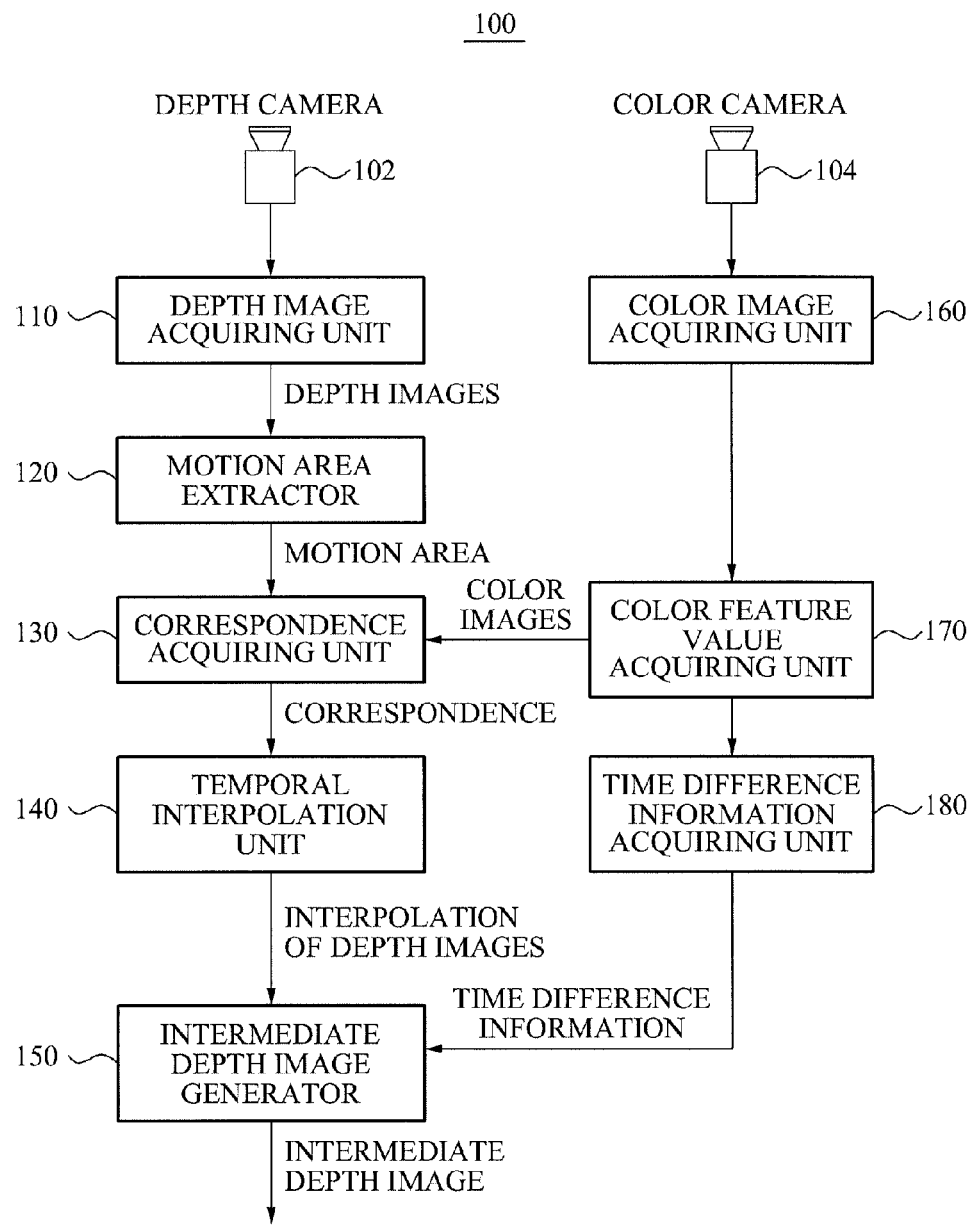
FIG. 1 illustrates a block diagram of a configuration of a three-dimensional (3D) depth image temporal interpolation apparatus according to embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a block diagram of a configuration of a three-dimensional (3D) depth image temporal interpolation apparatus 100 according to embodiments.

Referring to FIG. 1, the 3D depth image temporal interpolation apparatus 100 may include a depth image acquiring unit 110, a motion area extractor 120, a correspondence acquiring unit 130, a temporal interpolation unit 140, an intermediate depth image generator 150, a color image acquiring unit 160, a color feature value acquiring unit 170, and a time difference information acquiring unit 180.

The depth image acquiring unit 110 may acquire depth images from a depth camera 102.

In the embodiment of FIG. 1, the depth camera may acquire a 3D depth image, namely a depth point cloud, using a Time of Flight (TOF) procedure. The depth camera 102 may be inferior in resolution and accuracy, compared with a color camera 104.

Accordingly, depth images generated by the depth camera 102 may be combined with color images generated by the color camera 104, to acquire a high-precision 3D image. However, conventionally, when time synchronization is not performed between the color images and the depth images, it is difficult to match color images and depth images since only the color images exist and the depth images do not exist. Thus, when depth images corresponding to color images do not exist, the 3D depth image temporal interpolation apparatus may generate an intermediate depth image in a desired time (namely, a desired depth image).

To obtain the desired depth image, the motion area extractor 120 may extract a motion area including a moving object from the acquired depth images. Each of the depth images may include a plurality of depth frames. Hereinafter, two neighboring depth frames among a plurality of depth frames forming a single depth image will be described as a non-limiting example.

Figure 2:
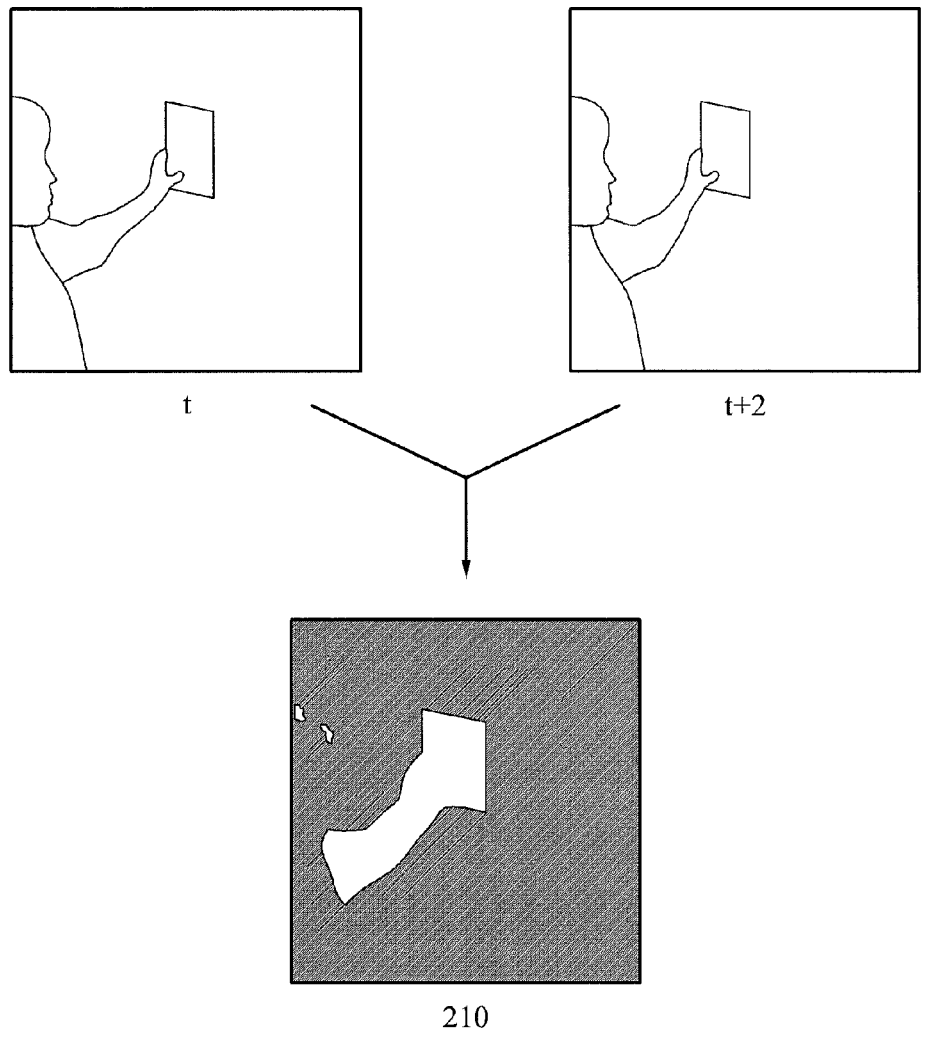
FIG. 2 illustrates an example of extracting a motion area from a depth image according to embodiments.

FIG. 2 illustrates an example of extracting a motion area from a depth image according to embodiments.

Referring to FIG. 2, to obtain a new intermediate depth frame 210 from two neighboring depth frames of time points 't' and 't+2', a 'dense motion flow' between the two depth frames of time points 't' and 't+2' is obtained. The intermediate depth frame 210 may be located between the two neighboring depth frames of time points 't' and 't+2'. Additionally, a motion extraction procedure may be performed so that embodiments may be appropriately applied even in an environment with various objects to be captured and camera motions where a plurality of independent deformable objects may exist in each depth frame.

In one example, when a moving object does 'not' exist in a depth image, such as in the case of a static background, the motion extraction procedure may be performed to generate a depth image in an optional intermediate time as an average of two depth images. That is, when the motion area extractor 120 fails to extract a motion area from a depth image, such as when a motion area does not exist in the depth image, the intermediate depth image generator 150 may generate, as an average of the depth image and a neighboring depth image located adjacent to the depth image, an intermediate depth image in a new time.

In another example, when a 'single' moving rigid object exists in a depth image, such as in the case of a moving background, the motion extraction procedure may be performed to extract a motion area including the moving rigid object, and to acquire correspondence information regarding a correspondence between depth images using the depth images in the extracted motion area, so that a 'dense motion flow' may be obtained.

In still another example, when 'two' moving rigid objects exist in a depth image, or when a single moving deformable object or a single moving rigid object, and a background exist, the motion extraction procedure may be performed to separate motion areas including the moving objects and to acquire correspondence information regarding a correspondence between depth images using the depth images in the separated motion areas, so that a 'dense motion flow' may be obtained.

Accordingly, the correspondence acquiring unit 130 may acquire correspondence information regarding a correspondence between the depth images from which the motion area is extracted.

Figure 3:
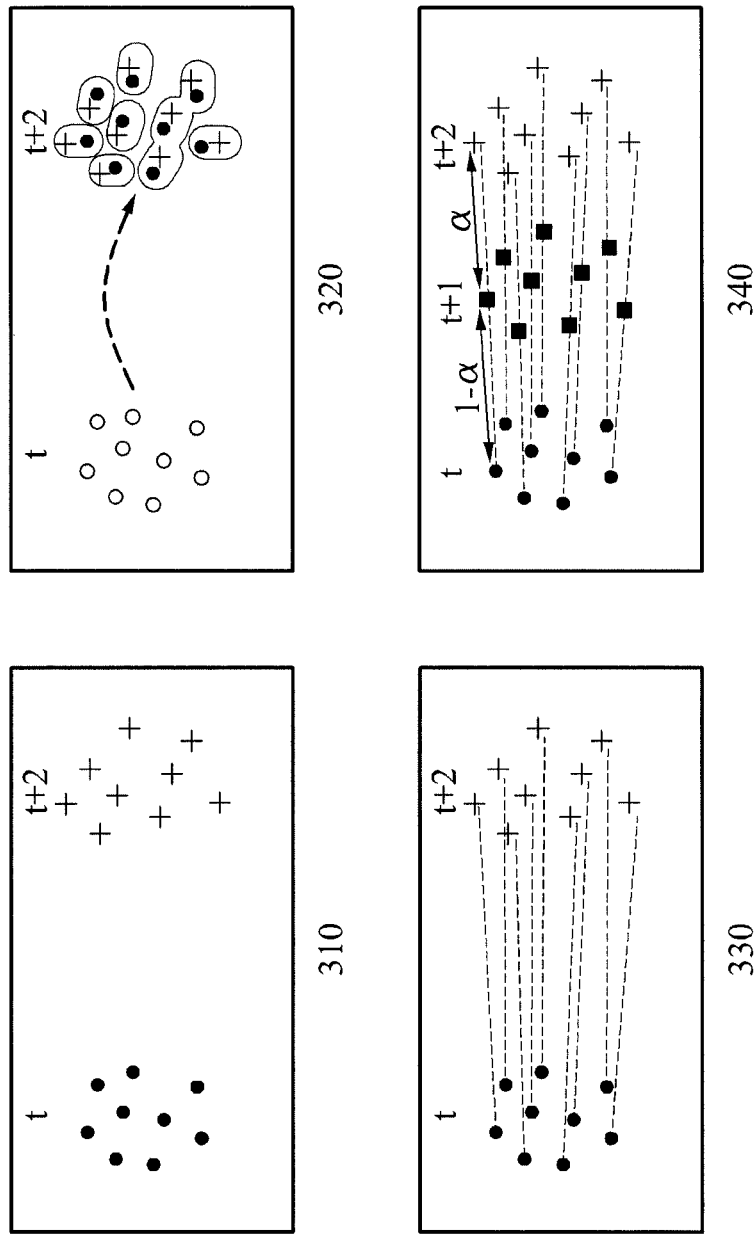
FIG. 3 illustrates an example of acquiring correspondence information regarding a correspondence between depth images from which a motion area is extracted according to embodiments.

FIG. 3 illustrates an example of acquiring correspondence information regarding a correspondence between depth images from which a motion area is extracted according to embodiments.

Referring to FIG. 3, in operation 310, the depth image acquiring unit 110 may acquire two neighboring depth images of time points 't' and 't+2' from a depth camera 102. Additionally, the color image acquiring unit 160 may acquire, from a color camera 104, color images that are located temporally adjacent to the depth images of time points 't' and 't+2'. The color feature value acquiring unit 170 may acquire color feature values from the acquired color images.

In operation 320, the correspondence acquiring unit 130 may compensate for a motion in a motion area included in the acquired depth images of time points 't' and 't+2' using an Iterative Closest Point (ICP) procedure, and may acquire correspondence information regarding a correspondence between the depth images of time points 't' and 't+2' where the motion is compensated for.

In the case of a rigid object, correspondence information without a significant number of outliers in most of points may be obtained. However, in the case of a general non-rigid object, a plurality of false correspondences may occur when considering deformation of corresponding points. To obtain true correspondences, the correspondence acquiring unit 130 may acquire information regarding an optimal correspondence, based on at least one of a distance between the depth images of time points 't' and 't+2', a continuity between the depth images of time points 't' and 't+2' and color images, and color feature values of the color images in operation 330. The color images may be in a same time zone as the depth images of time points 't' and 't+2'.

In operation 340, the temporal interpolation unit 140 may interpolate the depth images of time points 't' and 't+2' based on the acquired correspondence information, using a temporal interpolation procedure, and the intermediate depth image generator 150 may generate an intermediate depth image of time point 't+1' in a desired time, based on the interpolated depth images of time points 't' and 't+2'.

Figure 4A:
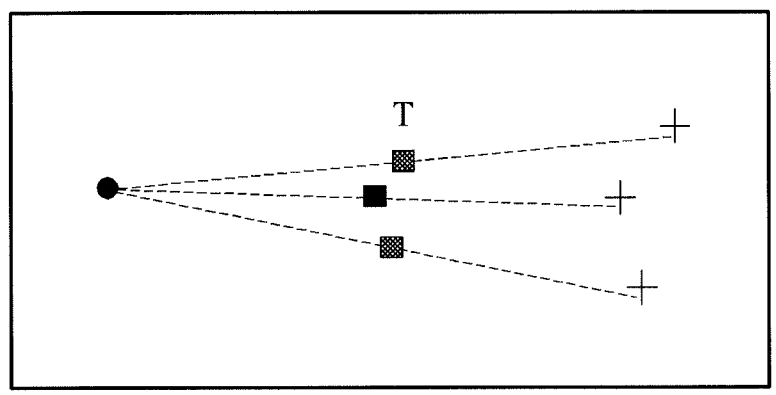
FIGS. 4A and 4B illustrate examples of generating an intermediate depth image based on correspondence between depth images according to embodiments.
Figure 4B:
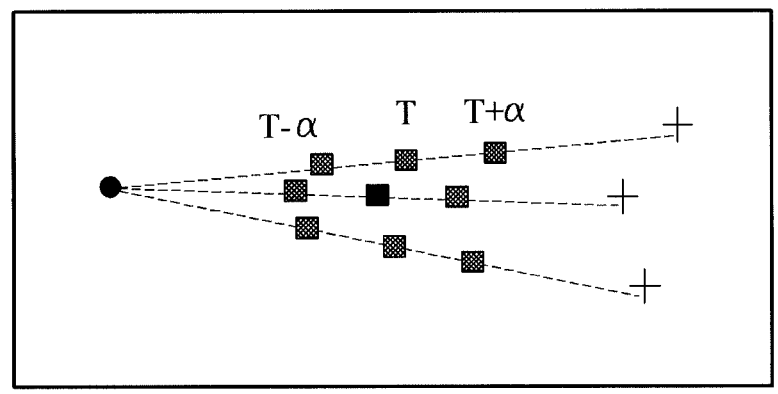

FIGS. 4A and 4B illustrate examples of generating an intermediate depth image based on a correspondence between depth images according to embodiments.

Referring to FIGS. 4A and 4B, the intermediate depth image generator 150 may generate an intermediate depth image, depending on whether a time 'T' within which the intermediate depth image is desired to be generated is given in advance.

As shown in FIG. 4A, when synchronization information provided by a depth camera 102 and a color camera 104 is given in advance, or when time difference information α between depth images and color images is given in advance by a one lens-one sensor operation procedure that is already known, the temporal interpolation unit 140 may interpolate the depth images based on the acquired correspondence information using the temporal interpolation procedure, without separately estimating the time difference information α.

However, as shown in FIG. 4B, when time difference information between depth images acquired from a depth camera and color images acquired from a color image is not known, or when the time difference information is not given even when the time difference information exists, estimation of the time difference information α may be performed to give weights for each depth image during interpolation of two neighboring depth images. Accordingly, the time difference information acquiring unit 180 may optimize at least one of the acquired color images, the correspondence information, and a time variable, and may acquire the time difference information α between the depth images and the color images.

Subsequently, the intermediate depth image generator 150 may generate an intermediate depth image in a new time, based on the acquired time difference information α.

The intermediate depth image generator 150 may generate the intermediate depth image in the new time using a color image in a desired time. Specifically, the intermediate depth image generator 150 may acquire a color image in a desired time, and may generate an intermediate depth image in a desired time based on the acquired color image.

FIG. 5 illustrates an example of generating an intermediate depth image in a new time according to embodiments.

Referring to FIG. 5, in operation 510, the motion area extractor 120 of FIG. 1 may extract a motion area (516 of operation 520) including a moving object, from two neighboring depth images 512, 514 among acquired depth images.

In operations 520 and 530, the correspondence acquiring unit 130 may compensate for a motion in the motion area 516 using the ICP procedure, and may acquire correspondence information regarding a correspondence between the depth images 512, 514 where the motion is compensated for. Here, the correspondence acquiring unit 130 may perform deformable depth warping using the acquired correspondence information.

In operation 540, the temporal interpolation unit 140 may interpolate the depth images 512, 514 based on the acquired correspondence information using the temporal interpolation procedure.

In operation 550, the intermediate depth image generator 150 may generate an intermediate depth image 518 in a desired time, from the interpolated depth images.

Figure 6:
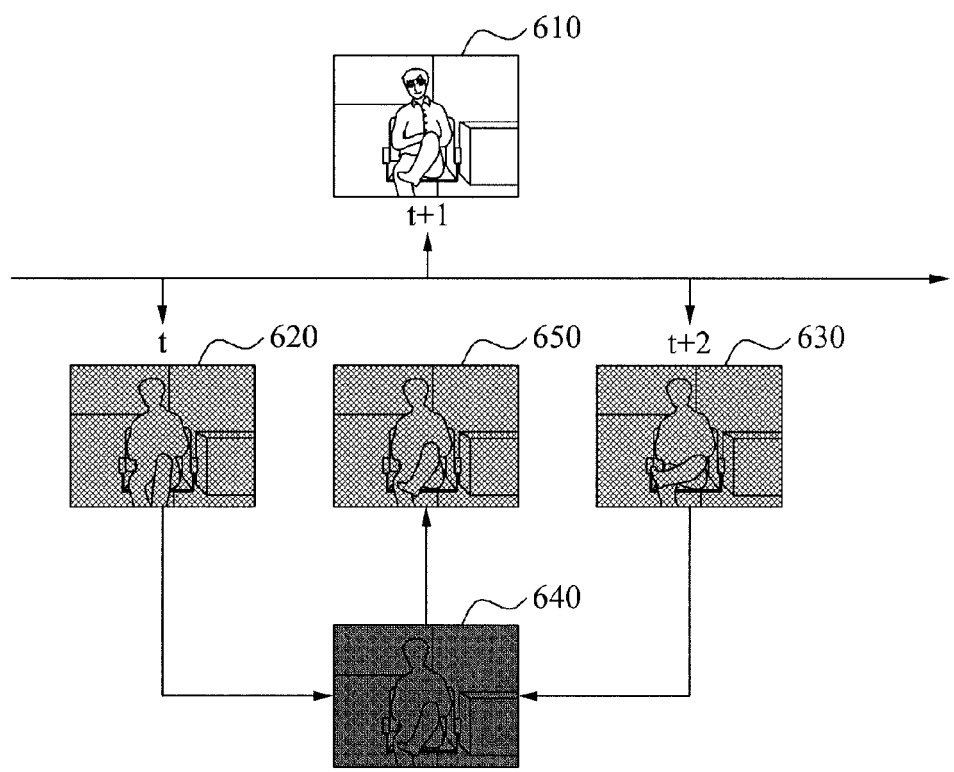
FIG. 6 illustrates an example of combining a depth image and a color image according to embodiments.

FIG. 6 illustrates an example of combining a depth image and a color image according to embodiments.

Referring to FIG. 6, when a depth image 620 of a time point 't' and a depth image 630 of a time point 't+2' exist, and when a depth image corresponding to a color image 610 of a time point 't+1' does not exist, the 3D depth image temporal interpolation apparatus 100 may generate an intermediate depth image 640 of the time point 't+1'. Subsequently, the 3D depth image temporal interpolation apparatus 100 may acquire correspondence information regarding a correspondence between the depth images 620 and 630, and may interpolate the depth images 620 and 630 based on the acquired correspondence information using the temporal interpolation procedure, to generate an intermediate depth image 650 of the time point 't+1'.

FIG. 7 illustrates a flowchart of a method of temporally interpolating a 3D depth image according to embodiments.

In operation 710, a motion area may be extracted from depth images acquired from a depth camera 102.

In operation 720, correspondence information regarding a correspondence between the depth images from which the motion area is extracted may be acquired.

For example, when color images located temporally adjacent to the depth images is acquired from a color camera 104, the correspondence information may be acquired based on at least one of a continuity between the acquired color images and the depth images, a distance between the depth images, and color feature values of the color images.

Additionally, a motion in the motion area included in the depth images may be compensated for using an ICP procedure, and correspondence information regarding a correspondence between the depth images where the motion is compensated for may be acquired.

In operation 730, the depth images may be interpolated based on the acquired correspondence information, using a temporal interpolation procedure.

In operation 740, an intermediate depth image in a desired time may be generated from the interpolated depth images. Here, at least one of the acquired color images, the correspondence information, and a time variable may be optimized, and time difference information between the depth images and the color images may be acquired. Additionally, an intermediate depth image in a new time may be generated based on the acquired time difference information.

In one example, an intermediate depth image in a new time may be generated using a color image in a desired time.

In another example, when a motion area does not exist in a depth image among the depth images, an intermediate depth image in a new time may be generated as an average of the depth image and a neighboring depth image located adjacent to the depth image.

The methods according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts.

The embodiments can be implemented in computing hardware (computing apparatus) and/or software, such as (in a non-limiting example) any computer and/or at least one processor that can store, retrieve, process and/or output data and/or communicate with other computers and/or processors. The results produced can be displayed on a display of the computing hardware. A program/software implementing the embodiments may be recorded on a computer-readable media, e.g., a non-transitory or persistent computer-readable medium. The program/software implementing the embodiments may also be transmitted over a transmission communication path, e.g., a network implemented via hardware. Examples of the non-transitory or persistent computer-readable media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/μW.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. An apparatus temporally interpolating a three-dimensional (3D) depth image, the apparatus comprising:
   a correspondence acquiring unit to compensate for a motion in a motion area included in at least first and second depth images using an Iterative Closest Point (ICP) procedure, and to acquire correspondence information regarding a correspondence between the first and second depth images where the motion is compensated for;
   a color image acquiring unit to acquire color images from a color camera, the color images being located temporally adjacent to the first and second depth images;
   a temporal interpolation unit to interpolate the first and second depth images based on the acquired correspondence information and using a temporal interpolation procedure, the first and second depth images being generated from a depth camera;
   a time difference information acquiring unit to optimize at least one of the acquired color images, the correspondence information, and a time variable, and to acquire time difference information between the first and second depth images and the color images; and
   an intermediate depth image generator to generate an intermediate depth image in a new time using the interpolated first and second depth images,
   the intermediate depth image being located temporally between the first depth image and the second depth image.

2. The apparatus of claim 1, further comprising:
   a motion area extractor to extract the motion area from the first and second depth images, the motion area comprising a moving object.

3. The apparatus of claim 2,
   wherein the correspondence acquiring unit acquires the correspondence information regarding the correspondence between the first and second depth images, based on at least one of a continuity between the color images and the first and second depth images, a distance between the first and second depth images, and color feature values of the color images.

4. The apparatus of claim 1, wherein the intermediate depth image generator generates an intermediate depth image in the new time, based on the acquired time difference information.

5. The apparatus of claim 1,
   wherein the intermediate depth image generator generates the intermediate depth image in the new time using the acquired color images.

6. A method of temporally interpolating a 3D depth image, the method comprising:
   extracting a motion area from at least first and second depth images acquired from a depth camera;
   compensating for a motion in the motion area comprised in the first and second depth images using an Iterative Closest Point (ICP) procedure;
   acquiring color images from a color camera, the color images being located temporally adjacent to the first and second depth images;
   acquiring correspondence information regarding a correspondence between the first and second depth images where the motion is compensated for;
   interpolating the first and second depth images based on the acquired correspondence information, using a temporal interpolation procedure;
   optimizing at least one of the acquired color images, the correspondence information, and a time variable, and acquiring time difference information between the first and second depth images and the color images; and
   generating an intermediate depth image in a desired time from the interpolated first and second depth images, the intermediate depth image being located temporally between the first depth image and the second depth image.

7. The method of claim 6, wherein the acquiring correspondence information comprises:
   acquiring the correspondence information regarding the correspondence between the first and second depth images, based on at least one of a continuity between the color images and the first and second depth images, a distance between the first and second depth images, and color feature values of the color images.

8. The method of claim 6, wherein the generating comprises generating the intermediate depth image in the desired time based on the acquired time difference information.

9. The method of claim 6, wherein the generating comprises:
   generating the intermediate depth image in the desired time using the acquired color images.

10. At least one non-transitory computer-readable medium storing computer-readable instructions to control at least one processor to implement a method of temporally interpolating a 3D depth image, the method comprising:
   extracting a motion area from at least first and second depth images acquired from a depth camera;
   compensating for a motion in the motion area comprised in the first and second depth images using an Iterative Closest Point (ICP) procedure;
   acquiring color images from a color camera, the color images being located temporally adjacent to the first and second depth images:
   acquiring correspondence information regarding a correspondence between the first and second depth images from where the motion is compensated for;
   interpolating the first and second depth images based on the acquired correspondence information, using a temporal interpolation procedure;
   optimizing at least one of the acquired color images, the correspondence information, and a time variable, and acquiring time difference information between the first and second depth images and the color images; and
   generating an intermediate depth image in a desired time from the interpolated first and second depth images,
   the intermediate depth image being located temporally between the first depth image and the second depth image.

* * * * *